Nov. 9, 1965   ÅKE ASTBERG   3,216,280
MEANS FOR FORWARD AND REVERSE GEAR DRIVE
OF HYDRODYNAMIC TORQUE CONVERTERS
Filed Sept. 18, 1961   4 Sheets-Sheet 4

United States Patent Office 3,216,280
Patented Nov. 9, 1965

3,216,280
MEANS FOR FORWARD AND REVERSE GEAR DRIVE OF HYDRODYNAMIC TORQUE CONVERTERS
Åke Astberg, Ektorp, Sweden, assignor to Svenska Rotor Maskiner Aktiebolag, Stockholm, Sweden
Filed Sept. 18, 1961, Ser. No. 138,752
Claims priority, application Sweden, Oct. 5, 1960, 9,492/60
9 Claims. (Cl. 74—677)

The present invention serves the purpose of reversing the output shaft of a hydrodynamic torque converter in a simple way. The converter is provided with a reaction member, and with gearing means for connecting the reaction member on one hand with the output shaft for rotation in opposite directions at a certain speed ratio, and on the other hand with the turbine member for rotation in the same direction at a certain speed ratio. Such a hydrodynamic torque converter is earlier known per se from the Swedish Patent No. 178,525.

At the torque converter shown in this patent the shaft of the turbine member is nonrotatably connected to the output shaft so that the output shaft is continuously rotating in the same direction as the turbine member. It is, however, especially at vehicles desirable to reverse the output shaft in a simple way without resorting to a separate reverse gear.

According to the invention this problem has been solved in the following way. The connection between the turbine shaft and the output shaft has been constructed as a releasable friction clutch, located between the gear of the turbine shaft for cooperation with the reaction member through the gearing for rotation in the same direction and the gear of the output shaft for cooperation with the reaction member through the gearing for rotation in opposite directions. In this way an extremely simple method has been obtained for reversing the output shaft by means of operation of friction clutches only. In this way the planetary gearing with brake or free-wheel and clutch which ordinarily is used for reversing the output shaft will be replaced by one single release clutch.

With the release clutch engaged the characteristics of the torque converter will be maintained as in the patent mentioned above and give suitable gear ratios for forward drive.

If on the other hand the clutch is released, there will be quite new drive conditions. If both the gearings connecting the reaction member with the turbine shaft and the output shaft, respectively, are released all torque transmission through the torque converter is cut off. If on the other hand both the gearings are engaged simultaneously the following will happen. Owing to the circulation of the hydraulic fluid the turbine member will rotate in the same direction as the pump member. The reaction member which at low speed ratios between the turbine and pump members tries to move in the opposite direction to that of the pump and turbine members is coerced by the forward rotation gearing to rotate in the same direction as the turbine and pump members. Owing to the opposite direction gearing between the reaction member and the output shaft the latter will be rotated in the opposite direction to that of the turbine and pump members, i.e. the output shaft has been reversed.

The complete disengagement of the drive connection between the turbine shaft and the output shaft will, however, bring about new problems which also must be solved in order to produce a hydrodynamic torque converter that will function perfectly. With the torque converter in neutral position, i.e. with the clutch as well as both the gearings released the turbine member will be unloaded and rotate with almost the same speed as the pump member. At a fast and complete engagement of the turbine shaft to the output shaft the turbine member will in this way be decelerated very rapidly which unavoidably will bring about a jerk through the whole transmission. In order to avoid such a jerk it is suitable to construct the operating devices for engaging the gearings and the clutch in the following way. When the valve controlling the change from neutral to forward and reverse drive is moved to its position for forward drive the reverse rotation gearing is engaged immediately, while the clutch is engaged only so much that a certain slip is obtained in the clutch. In this way the turbine will be loaded by a certain torque without any jerks so that its speed is decreased and the speed ratios between the turbine shaft and the output shaft is reduced so that there is no risk for any jerks at the final engagement of the clutch. This engagement is attained by the power control, i.e. the throttle of a combustion engine, is moved to a position for increased power. In a similar way jerks are avoided at the engagement of reverse drive. When the control valve is moved to its position for reverse drive the forward drive gearing is engaged immediately while the engagement of the opposite direction gearing is delayed in the same way as said above regarding the clutch at forward drive.

For illustration of the separate characteristics and advantages more in detail two suitable embodiments of the invention are shown in the attached drawings.

Figure 1:
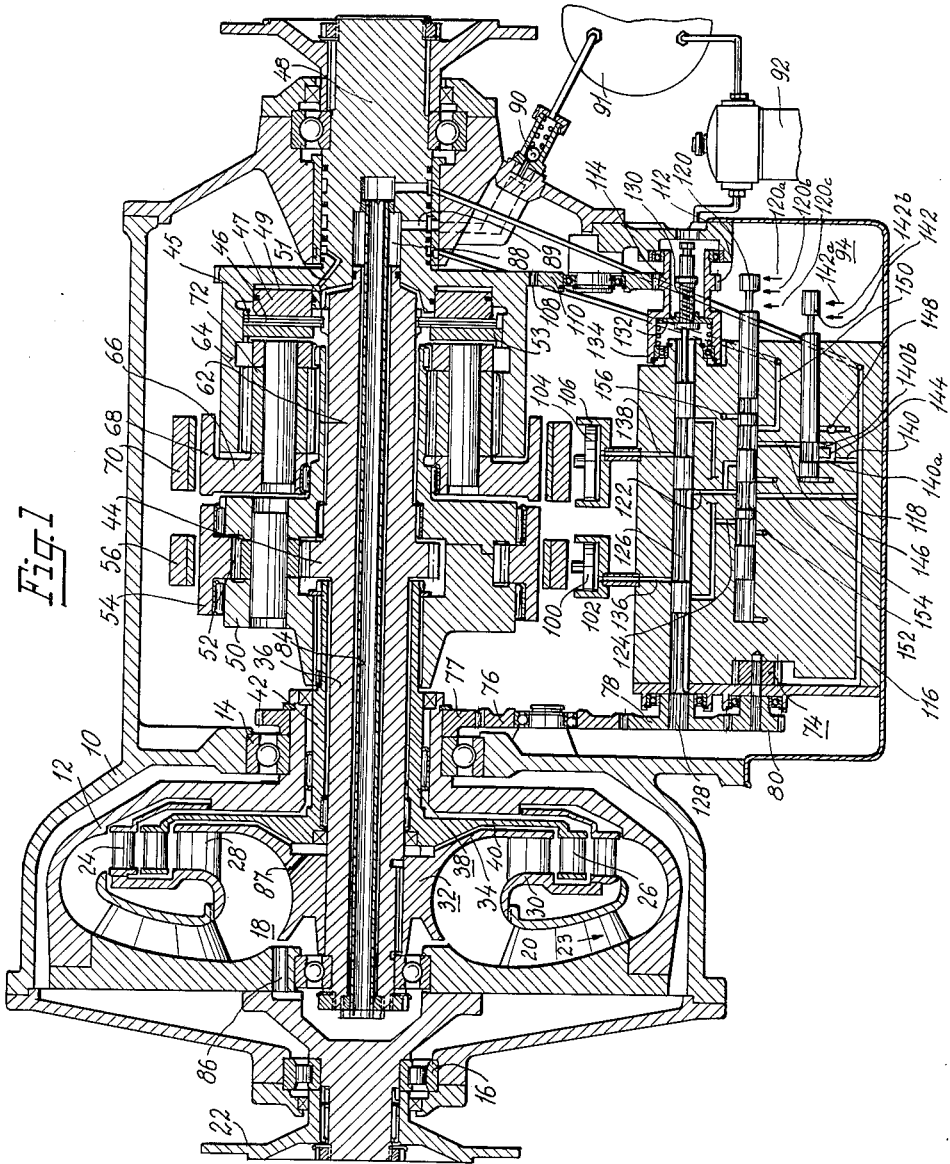
FIG. 1 shows a central longitudinal section through a converter according to the invention, whereby the drawing is more or less schematic with regard to certain parts and furthermore certain parts of the control system are brought into the plane of the drawing to facilitate the illustration and the description of these details.

According to FIG. 1 the torque converter is surrounded by a rotationally stationary outer housing 10, into which the casing 12 is rotatably mounted and supported by the main bearings 14 and 16.

The casing 12 encloses the circuit 18 of the hydraulic working medium and also supports the blades 20 which are mounted on one disc and forms the pump member.

The casing is by suitable means, for instance a flange connection 22, attached to a shaft from the power source which delivers power to the torque converter. The pump blades circulate the hydraulic medium in the circuit into a direction that is shown by the arrow 23 so that the fluid at first passes through a first ring of turbine blades 24, then through a ring of reaction blades 26, and at last through another ring of turbine blades 28 until it is returned to the inlet side of the pump blades 20. The two rings of turbine blades 24 and 28 are connected by a ring-like member 30 that forms a part of the case of the hydraulic circuit. The turbine member is generally indicated as 32 and has a hub portion 34 that supports the turbine blades 28 and a shaft portion 36 that is rotatably mounted in relation to the rotating casing 12.

The reaction blades 26 are supported by a reaction member that is generally indicated as 38 and comprises a hub portion 40 and shaft portion 42, whereby the reaction member is rotatably mounted in relation to the turbine member 32 as well as the rotating casing 12.

The shaft portion 36 of the turbine member is provided with a gear 44 that is attached to the shaft and forms the sun gear of a planetary gearing that is a part of a compound gearing which later on will be described more in detail.

The turbine shaft 36 is connected with the output shaft 48 by a releasable clutch 45. This clutch comprises at least one clutch disc 46 nonrotatably connected to the turbine shaft 36, a hydraulically operated piston 47 located in an annular cylindrical chamber 49 which is provided with a feed line 51 in the output shaft 48, and an axially stationary member 53 nonrotatably connected with the output shaft, and possibly also discs that are nonrotatable in relation to the output shaft.

The shaft portion 42 of the reaction member 38 is nonrotatably connected with a planet carrier 50 for instance by a wedge or by splines. This planet carrier carries planets 52 which form a part of the gearing in which the gear 44 is the sun gear. This gearing is made complete by a ring gear 54 with internal teeth which intermesh with the teeth of the planets 52. The ring gear 54 is rotatably mounted for rotation in either direction and can be held against rotation by a releasable brake 56.

The planet carrier has a projection on one side of the planets 52 that forms the sun gear 62 of another planetary gearing. The sun gear 62 is in mesh with planets 64 carried by a planet carrier 66 which has a drum portion 68 shaped as a part of a releasable brake 70 purposed for holding the planet carrier 66 against rotation. The teeth of the planets 64 are also in mesh with internal teeth of the ring gear 72 that is nonrotatably connected with the output shaft 48.

From a gear pump 74 driven by the rotating casing 12 through the gears 76, 77, 78, 80 the pressure fluid is distributed through a channel 84 inside the turbine shaft 36 and through a channel 86 to the hydraulic circuit and is carried away from there by channels 87, 88 and 89 to a pressure valve 90 which maintains a minimum pressure in the circuit. From this pressure valve the fluid through a cooler 91 and a strainer 92 is returned to the oil sump 94.

For its operation the brake 56 is provided with a piston 100 located in a cylinder 102 and the brake 70 is in the same way provided with a piston 104 and a cylinder 106.

A ring gear 108 located on the output shaft 48 cooperates with a gear 110 which in its turn is in mesh with a gear 112 located on a socket 114 that forms one part of a regulator of the hydraulic control system which will later be described more in detail.

Figure 2:
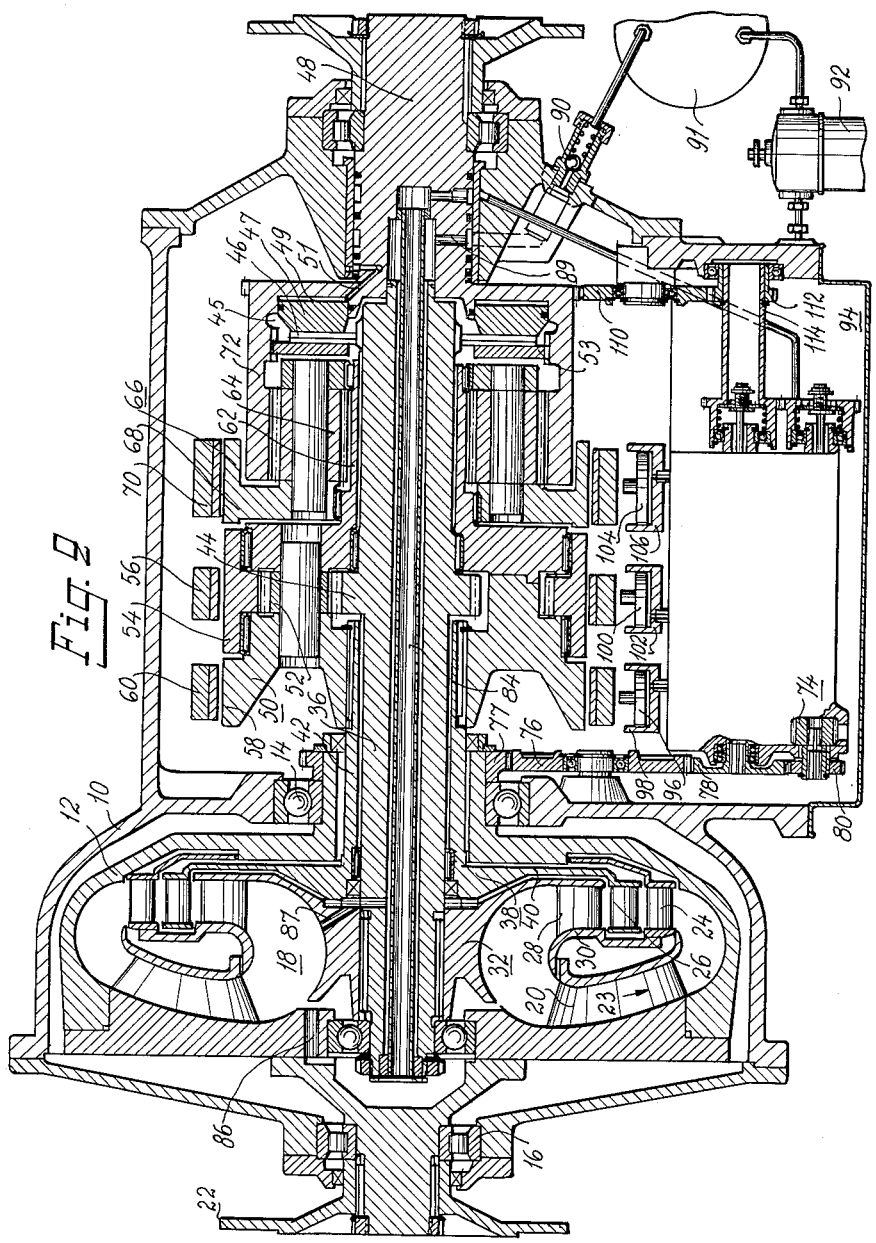
FIG. 2 shows a longitudinal section through another embodiment of a torque converter according to the invention.

FIG. 2 shows another embodiment of the invention which is a little more complicated than that of FIG. 1 and which differs from that one in the following details. The planet carrier 50 is provided with a brake drum 58 which forms a part of a brake 60. For its operation this brake is provided with a piston 96 located in a cylinder 98.

The control system will now be described more in detail with reference to FIGS. 1 and 3–7. The purpose of the control system is to operate the two brakes 56 and 70 and the clutch 45 and for this reason it is provided with three valves. The first one of these valves is a quotient regulator valve which at forward drive of the output shaft changes the direction of rotation of the reaction member between rotation in the opposite and in the same direction as that of the turbine member at one certain speed ratio between the turbine and the pump members. The quotient regulator valve can furthermore be adjusted manually for compulsory engagement of the gearing for rotation in opposite directions in order to get braking effect. The second one of these valves is selectively adjustable between three different positions corresponding to neutral, forward drive and reverse drive. The third of these valves is a synchronizing valve adjusted between two positions corresponding low and high power, respectively, by the position of the power regulator of the driving engine, for instance the throttle valve of a combustion engine.

The control system is provided with pressure fluid from the gear pump 74. Due to the inclined section through the control system this pump seems to be located high above the bottom of the oil sump instead of at the bottom of this sump where it really is located.

The pressure fluid that is distributed from the pump 74 is carried through a channel 116 to the hydraulic circuit 18 as said above. Through a branch channel pressure fluid is carried to a cylindrical bore for a piston valve acting as a selectively adjustable selection valve 120. This bore communicates by two channels 122, 124 with a cylindrical bore for a quotient regulator valve 126. The quotient regulator valve at one end is provided with splines 128 and by these non-rotatably but axially slidably connected with the gear 78 driven by the rotating casing. At the other end the quotient regulator valve 126 is provided with threads and by these in mesh with a friction disc 132 which by the pressure of a spring 134 cooperates with the socket 114.

The bore for the valve 126 further communicates by the channels 136 and 138 with the cylinders 120 and 106, respectively, of the brakes 56 and 70.

The channel 116 for pressure fluid further communicates by a branch channel 140 with the bore for a synchronization valve 142 which is adjustable between two positions 142a, 142b due to the position of the power regulator of the driving engine, for instance the throttle valve of a combustion engine. The valve 142 is connected with the power regulator in such a way that when this regulator passes a certain position it acts upon an electrical switch which in turn opens or closes an electrical circuit enclosing a solenoid for shifting the synchronization valve 142. The channel 140 bifurcates into two branches 140a and 140b. In the branch 140b a plate 144 with a restricted opening is located so that the pressure of the fluid is reduced at the passage of the plate. This branch 140b communicates always through the bore with a channel 146 between said bore and the bore of the selection valve 120. Furthermore, an overflow valve 148 is connected with the bore of the synchronization valve 142 which overflow valve 148 reduces the pressure in the channels and chambers communicating with the valve. Possibly either the plate 144 with the restricted opening or the overflow valve 148 can be omitted. The bore of the selection valve 120 furthermore communicates through the channel 150 with the channel 51 and thus with the clutch 45, and through three channels 151, 154 and 156 with the oil sump 94.

The selection valve 120 is adjustable to three different positions 120a, 120b and 120c.

Figure 3:
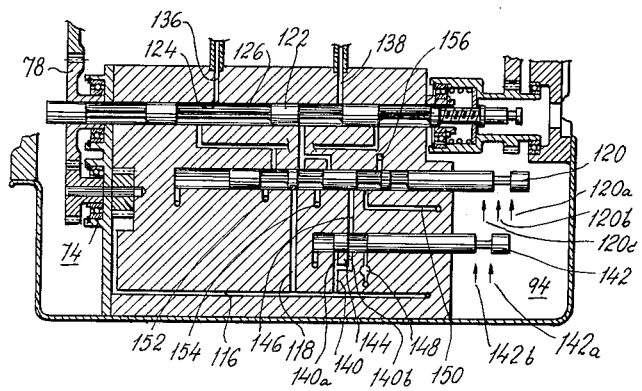
FIGS. 3–7 show a detail of FIG. 1 with the separate valves adjusted to different positions corresponding to different drive conditions.

With the selection valve 120 in the position 120a the channels 118 and 146 are closed and the channels 122, 124 and 150 and 51 communicate with the sump through the channels 154, 152 and 156, respectively. Both the brakes 56 and 70 and the clutch 45 are then released. The torque transmission through the torque converter is in this way interrupted (FIG. 3).

Figure 4:
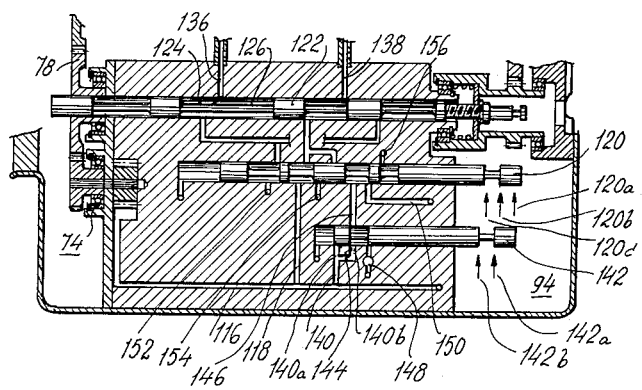
Figure 5:
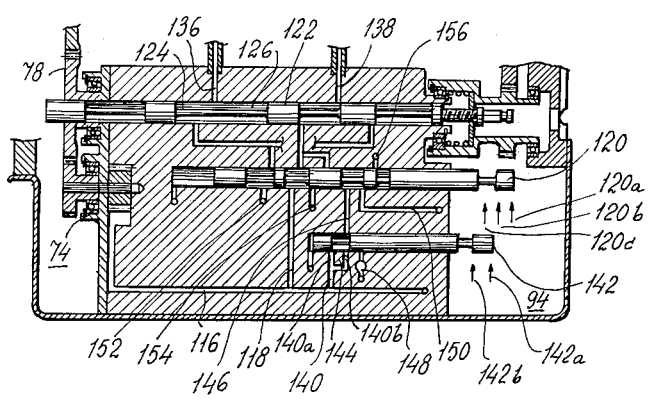

With the selection valve 120 in the position 120b the channel 118 communicates through the channel 122 with the quotient regulator valve 126 and owing to the position of this valve either with the channel 136 and the chamber 102 of the brake 56 or with the channel 138 and the chamber 106 of the brake 70. The other brake chamber is simultaneously emptied through the channels 124 and 152. The channel 140 simultaneously communicates through the channel 146 and the bore of the selection valve 120 with the channels 150, 51 to the clutch 45. Owing to the position of the synchronization valve 142 the fluid passes either through the branch 140b with the plate 144 with the restricted hole, whereby the pressure is held at a certain relatively low value by the overflow valve 148, or through the branch 142a, whereby the overflow valve 148, is disconnected and full pressure is transmitted to the clutch 45 (FIGS. 1, 4 and 5).

Figure 6:
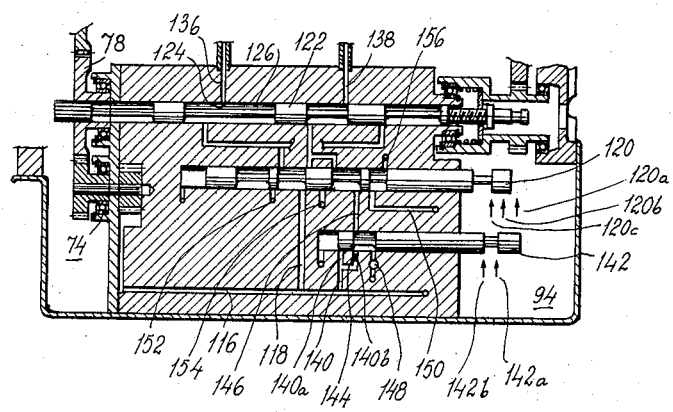
Figure 7:
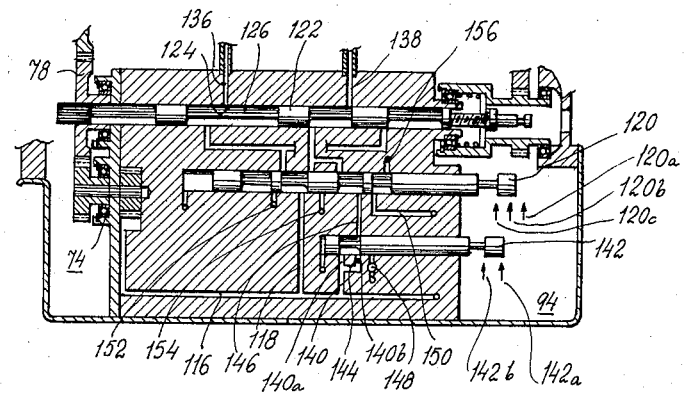

With the selection valve 120 in the position 120c the channel 118 communicates through the channel 124 with the quotient regulator valve 126 and with the channel 136 and the chamber 102 of the brake 56 as this one under existing condition always is located in its left-hand position. The channel 140 simultaneously communicates, through the channels 146, 128 and 138 with the chamber 106 of the brake 70. Owing to the position of the synchronization valve 142 the fluid passes either through the branch 140b with the plate 144 with the restricted hole, whereby the pressure is held at a certain relatively low value by the overflow valve 148, or through the branch 140a, whereby the overflow valve 148 is disconnected and the full pressure is transmitted to the brake 70. The clutch 45 is simultaneously held released as the channels 51, 150 communicates with the channel 156 and thus with the sump 94 (FIGS. 6 and 7).

At start of the driving engine the selection valve is held in its neutral position 120a, whereby as said above all torque absorbing and all torque transmitting are interrupted. (FIG. 3).

At an adjustment of the selection valve to the forward drive position 120b the brake chamber 106 is filled immediately and the gearing 62, 64, 72 for rotation in opposite directions is engaged. Furthermore, fluid with reduced pressure is supplied to the clutch 45 which pressure is too low to anchor the turbine member 32 and the output shaft to each other but high enough to load the turbine member 32 by slip to decrease its speed in such a way that the speed difference between the turbine member and the output shaft is so small that there is no jerk when they are finally engaged to each other (FIG. 4). This final engagement is caused by the opening of the throttle valve of the engine at which opening an electrical switch, not shown, influences a solenoid for adjustment of the synchronization valve 142 from its position 142a to its position 142b. In this position the valve opens the branch 140a and disconnects the overflow valve 148, whereby the pressure increases so that the clutch is engaged (FIG. 5). At increased speed of the output shaft the speed ratio between the output shaft and the pump member will be reached at which ratio the quotient regulator is adjusted from one position to the other, causing that the gearing 62, 64, 72 for rotation in opposite directions is released and the gearing 44, 52, 54 for rotation in the same direction is engaged (FIG. 1). This engagement is maintained as long as the speed ratio between the output shaft and the pump member is high and at the passage downwardly of the certain speed ratio of the quotient regulator the gearing for rotation in the same direction is released and the gearing for rotation in opposite directions is engaged.

At the adjustment of the selection valve 120 to its position 120c for reverse drive the brake chamber 102 is filled immediately and the gearing 44, 52, 56 for rotation in the same direction is engaged, so that the reaction member is forced to rotate in the same direction as the turbine member 32 at a certain speed ratio between said members. Furthermore fluid with a reduced pressure is supplied to the brake chamber 106 of the brake 70 of the gearing 62, 64, 72 for rotation in opposite directions which pressure is too low to anchor the planet carrier 66 but high enough to decrease its speed very considerably. In this way the speed of the reaction member 38 is decreased enough to avoid all jerks when the planet carrier is finally anchored (FIG. 6). This final engagement is caused by the opening of the throttle valve at which opening in the same way as said above the synchronization valve 142 is adjusted from its position 142a to its position 142b so that the valve opens the branch 140a and disconnects the overflow valve 148, whereby the pressure increases so that the planet carrier 66 is anchored (FIG. 7). In this way the output shaft is brought to rotate in the opposite direction to that of the reaction and turbine members, i.e. the transmission is changed for reverse drive.

In some instances it may be desirable for the reversing arrangement of the present invention to be applied to a transmission having an operating phase in forward direction in which the reaction member is held rotationally stationary so that the torque converter operates as a so-called single rotation converter. Such an arrangement is shown in the modification illustrated in FIG. 2 in which, in known manner, the planet carrier 50 is provided with a drum portion 58 located to be engaged by a brake 60 to anchor the carrier to the stationary structure, while the brakes 54 and 56 are released and clutch 45 is engaged. The addition of this third phase of forward drive in no way alters the functioning of the apparatus previously described insofar as the obtaining of forward and reverse directions of drive to the output shaft are concerned and since the specific manner of obtaining the single rotation phase of forward drive forms per se no part of the present invention and is a part of the published prior art further and more detailed description and illustration herein is not required.

Of course the invention is not limited to the described embodiment but encloses everything within the scope of the following claims.

I claim:

1. A transmission for transmitting power between an input and an output shaft comprising rotationally stationary structure, a hydrodynamic torque converter having a closed hydraulic circuit, a rotatively mounted pump member connected with the input shaft, a rotatably mounted turbine member, a rotatably mounted reaction member, said members having blades located in said circuit, a first gearing interconnecting said turbine and reaction members for positive power transmission therebetween, said first gearing comprising a first element in the path of power transmission which when rotationally stationary imposes on said turbine and reaction members rotation in the same direction at a fixed relative speed ratio, first anchoring means for anchoring said first element to the rotationally stationary structure, a second gearing inter-connecting said reaction and output members for positive power transmission therebetween, said second gearing comprising a second element in the path of power transmission which when rotationally stationary imposes on said reaction and output members rotation in opposite directions at a fixed relative speed ratio, second anchoring means for anchoring said second element to the rotationally stationary structure, clutch means interconnecting said turbine member and said output shaft for positive power transmission therebetween, means for engaging and disengaging said clutch means, and control means selectively operable to engage and disengage said anchoring means and said clutch means, said control means comprising a pressure fluid actuated system including a selector valve moveable to either one of two positions in a first of which engagement of said clutch means and of one only of said anchoring means is effected and in a second of which disengagement of said clutch means and engagement of both of said anchoring means is effected.

2. A transmission as defined in claim 1 in which said system further includes a regulator valve responsive to the speed ratio between said input and output shafts for determining which one of said anchoring means is engaged when said selector valve is in said first position.

3. A transmission as defined in claim 1 in which said selector valve is movable to a third position in which release of said clutch means and both of said anchoring means is effected.

4. A transmission as defined in claim 3 including a synchronizing valve having a synchronizing position for effecting reduction of the pressure of operating fluid delivered to said selector valve to effect delay in the full engagement of one of the means the engagement of which is effected by the pressure of said fluid.

5. A transmission as defined in claim 4 in which said reduced pressure is applied to said clutch means when said selector valve is moved to said first position.

6. A transmission as defined in claim 4 in which said reduced pressure is applied to said second anchoring means when said selector valve is moved to said second position.

7. A transmission as defined in claim 4 in which said synchronizing valve when in said synchronizing position delivers pressure fluid to said selector valve through conduit means having a restriction therein to effect the desired pressure reduction.

8. A transmission as defined in claim 4 in which said synchronizing valve is movable from said synchronizing position to a second position in which fluid at full pressure is supplied to said selector valve.

9. A transmission as defined in claim 8 in which said synchronizing valve is moved to its second position in response to increased power delivered to the transmission.

References Cited by the Examiner

UNITED STATES PATENTS

| | | | |
|---|---|---|---|
| 2,293,358 | 8/42 | Pollard | 74—677 |
| 2,316,390 | 4/43 | Biermann | 74—677 |
| 2,352,004 | 6/44 | Pollard | 74—677 |
| 2,381,772 | 8/45 | Pentz | 74—677 |
| 2,745,295 | 5/56 | Burnett | 74—677 |
| 2,749,773 | 6/56 | Simpson | 74—763 |
| 2,762,238 | 9/56 | Baker | 74—677 |
| 2,786,365 | 3/57 | Lammerz | 74—677 |
| 2,850,918 | 9/58 | Pollard | 74—677 |
| 2,883,881 | 4/59 | Baker | 74—678 |
| 2,884,809 | 5/59 | Moore | 74—677 |
| 2,905,025 | 9/59 | Karlsson et al. | 74—677 |
| 2,935,898 | 5/60 | Ahlen | 74—677 |
| 2,956,448 | 10/60 | Edsall | 74—677 |

FOREIGN PATENTS

| | | |
|---|---|---|
| 880,063 | 10/61 | Great Britain. |
| 580,642 | 8/58 | Italy. |

DON A. WAITE, *Primary Examiner.*